US012738133B2

(12) United States Patent
Bunker et al.

(10) Patent No.: US 12,738,133 B2
(45) Date of Patent: Sep. 15, 2026

(54) GENERATING NOVELTY SOUNDS BASED ON A STATE OF A BUILDING

(71) Applicant: Vivint, Inc., Provo, UT (US)

(72) Inventors: Brandon Bunker, Provo, UT (US); Erik Stephen Pfeiffer, Provo, UT (US); Michelle Bea Zundel, Provo, UT (US); Hayley Ketch, Provo, UT (US); Andrew Adams, Provo, UT (US)

(73) Assignee: Vivint LLC, Provo, UT (US)

( * ) Notice: Subject to any disclaimer, the term of this patent is extended or adjusted under 35 U.S.C. 154(b) by 37 days.

(21) Appl. No.: 18/917,738

(22) Filed: Oct. 16, 2024

(65) Prior Publication Data

US 2025/0124775 A1 Apr. 17, 2025

Related U.S. Application Data

(60) Provisional application No. 63/591,084, filed on Oct. 17, 2023.

(51) Int. Cl.

*G08B 13/19* (2006.01)
*G08B 3/10* (2006.01)
*G08B 13/196* (2006.01)

(52) U.S. Cl.

CPC ......... *G08B 13/19613* (2013.01); *G08B 3/10* (2013.01)

(58) Field of Classification Search

CPC ................................................ G08B 13/19613
USPC .......................................................... 340/541
See application file for complete search history.

(56) References Cited

U.S. PATENT DOCUMENTS

| | | | |
|---|---|---|---|
| 6,654,732 | B1 | 11/2003 | Naito et al. |
| 6,748,343 | B2 | 6/2004 | Alexander et al. |
| 7,193,644 | B2 | 3/2007 | Carter |
| 7,956,739 | B2 | 6/2011 | Hong et al. |
| 8,139,095 | B2 | 3/2012 | Carter |
| 8,144,183 | B2 | 3/2012 | Carter |
| 8,144,184 | B2 | 3/2012 | Carter |
| 8,154,581 | B2 | 4/2012 | Carter |
| 8,164,614 | B2 | 4/2012 | Carter |
| 9,414,030 | B2 | 8/2016 | Carter |

(Continued)

OTHER PUBLICATIONS

Hossain et al., "Adaptive Interaction Support in Ambient-Aware Environments Based on Quality of Context Information" in Multimed tools Appl (2013) 67: pp. 409-432 (Year: 2013).

(Continued)

*Primary Examiner* — Travis R Hunnings
(74) *Attorney, Agent, or Firm* — Nolte Lackenbach Siegel; N. Alexander Nolte

(57) ABSTRACT

Presented herein are system and methods for generating overlayed sounds to deter perpetration of an event A system can include an image capture device and one or more processors coupled with memory. The system can detect an entity within an area. The system can determine that the entity corresponds to one or more criteria. The system can identify a first sound corresponding to the one or more criteria and a state of the area. The system can play, by a speaker device, the first sound to deter the entity from perpetrating an event within the area. The system can identify a second sound corresponding to the one or more criteria, the state of the area, and the first sound. The system can play, by the speaker device, the second sound to deter the entity from perpetrating the event.

20 Claims, 2 Drawing Sheets

(56) References Cited

U.S. PATENT DOCUMENTS 9,432,638 B2 8/2016 Carter
9,485,478 B2 11/2016 Carter
9,516,284 B2 12/2016 Carter
9,648,290 B2 5/2017 Carter
9,653,323 B2 5/2017 Chew
10,674,120 B2 6/2020 Carter
10,986,717 B1 4/2021 Fu et al.
11,195,398 B1 12/2021 Fu et al.
11,308,333 B1 * 4/2022 Langford ............... G06V 20/52
11,581,099 B1 2/2023 Rufo et al.
2002/0070859 A1 6/2002 Gutta et al.
2002/0086660 A1 7/2002 Sullivan et al.
2003/0117280 A1 * 6/2003 Prehn ............... G08B 13/19684 340/541
2003/0118216 A1 6/2003 Goldberg
2005/0176400 A1 8/2005 Mullet et al.
2005/0281435 A1 12/2005 Aggarwal
2006/0041500 A1 2/2006 Diana et al.
2009/0048859 A1 2/2009 McCarthy et al.
2009/0299825 A1 12/2009 Olawski et al.
2009/0299854 A1 12/2009 Olawski et al.
2010/0082174 A1 4/2010 Weaver et al.
2010/0289643 A1 11/2010 Trundle et al.
2011/0054973 A1 3/2011 Deich et al.
2012/0023145 A1 1/2012 Brannon et al.
2012/0284777 A1 11/2012 Eugenio et al.
2012/0316690 A1 12/2012 Li et al.
2014/0015981 A1 1/2014 Dietl
2014/0266681 A1 9/2014 Small
2014/0278028 A1 9/2014 Nye et al.
2014/0282048 A1 9/2014 Shapiro et al.
2014/0324192 A1 10/2014 Baskaran et al.
2015/0039105 A1 2/2015 Lee et al.
2015/0088329 A1 3/2015 Thiruvengada et al.
2015/0108901 A1 4/2015 Greene et al.
2015/0228419 A1 8/2015 Fadell et al.
2016/0142407 A1 5/2016 Chun et al.
2016/0261425 A1 9/2016 Horton et al.
2016/0274230 A1 9/2016 Wu et al.
2016/0350654 A1 12/2016 Lee et al.
2017/0262706 A1 9/2017 Sun et al.
2018/0035901 A1 2/2018 Cronin et al.
2018/0047274 A1 2/2018 Miwa
2018/0114420 A1 4/2018 Siminoff et al.
2018/0165933 A1 6/2018 Siminoff
2018/0189913 A1 7/2018 Knopp et al.
2018/0240454 A1 8/2018 Raj et al.
2018/0294047 A1 10/2018 Hosseini et al.
2018/0341835 A1 11/2018 Siminoff
2019/0087646 A1 3/2019 Goulden et al.
2019/0108404 A1 4/2019 Xu
2019/0156601 A1 5/2019 Sinha et al.
2019/0327448 A1 10/2019 Fu et al.
2020/0180506 A1 6/2020 Nakayama et al.
2021/0020007 A1 * 1/2021 Vazirani ................. G08B 15/00
2021/0056184 A1 2/2021 Modani et al.
2021/0201640 A1 * 7/2021 Harel ............... G08B 13/19645
2021/0358278 A1 * 11/2021 Goldstein .............. G08B 15/00
2022/0165036 A1 5/2022 Daley et al.
2023/0245541 A1 * 8/2023 Amir ...................... G08B 15/00 340/541
2023/0281997 A1 * 9/2023 Merkley ............... H04W 4/023 340/541
2024/0296725 A1 * 9/2024 Pfeiffer .................. G06V 20/52
2025/0218265 A1 * 7/2025 Pfeiffer ............ G08B 13/19613
2025/0225850 A1 * 7/2025 Merkley ................ G06V 40/20

OTHER PUBLICATIONS

Unboxing The Ring Video Dorrbell is it Worth it video.

* cited by examiner

GENERATING NOVELTY SOUNDS BASED ON A STATE OF A BUILDING

CROSS REFERENCE TO RELATED APPLICATIONS

The present application claims the benefit of and priority to U.S. provisional application No. 63/591,084, filed on Oct. 17, 2024, the content of which is hereby incorporated by reference as if set forth in its entirety herein.

TECHNICAL FIELD

This application generally relates to generating novelty sounds. In particular, the present application relates to playing novelty sounds upon detection of an entity within an area.

BACKGROUND

Entities enter into areas within a field of view of a camera, such as a home protected by a security system. The entities can be unknown and unidentifiable, thereby making it difficult to distinguish between friendly entities and unfriendly entities. Furthermore, an unfriendly entity may perpetrate an event, such as a burglary, solicitation, vandalization, or other undesirable event. Friendly entities may be deterred by a presence of the system, actions of the systems, among others. The camera may emit a siren or other such noise upon a detection of the entity in the area to alert homeowners or neighbors of the entity and to further deter the entity from perpetrating the event. However, due to the entity being unidentifiable, the siren may play regardless of if the entity is friendly or unfriendly. This can cause false-positive trigger of the siren intended to warn of unfriendly entities.

SUMMARY

Upon detecting the presence of an entity, a system may emit a sound related to a state of an area to conform to a theme. The sound emitted by the system may be stagnant and result regardless of the identity of the entity. The system may not monitor for a response received from the entity and thereby may not configure the sound for the entity or actions performed by the entity, thereby negating the functionality of the system. For example, the system can produce false positive alarms due to not identifying the entity, which detract from efficiency of the system by wasting resources such as power used to produce an audio output or computational power. Furthermore, the system may fail to provide audio configured for the specific entity or actions which causes the entity to refrain from perpetrating the event, further negating the functionality of the system and wasting resources.

To address these and other technical challenges, a system can be configured to generate and update a response including audio based at least on the area. The system can detect the presence of the entity within a zone configured for the system. The entity can be a friendly entity, such as a known neighbor, the mailman, or a child, or an unfriendly entity, such as a suspected burglar, loiterer, or other suspicious entity. By using a variety of sensors as well as image recognition and audio recognition techniques, the system can determine a type of the entity. The system can determine to provide a security action, such as an audio output, based on the type of the entity or the state of the area.

The system can provide a multitude of sounds based on a state of the area. For example, the system can include whistles, human voices, themed sounds, songs, sirens, beeps, animal noises, ballistics noises, among others. The system can generate the sounds using one or more of prerecorded audio or computer-generated audio, including audio generated by artificial intelligence or playback of computer-instructed tones. Generating and providing layers of audio can create a realistic soundscape which demonstrates a theme to friendly entities. For example, the system can generate a realistic auditory simulation of an environment which conforms to a theme associated with the state of the area. For example, the system can provide holiday bells, cheerful laughter, scary noises, sci-fi noises, or other novelty sounds based on the state of the area.

The system can monitor how often or with which frequency a sound is played. The system can track this information per entity, per household, or per location, among others. In this manner, the system can determine to play sounds which both provide a high likelihood of deterring the entity from performing the event or providing sounds corresponding to the theme and which have not been played too frequently, to ensure variance in the alarm responses such that the entity does not become familiar with the sounds and attribute them to the system as opposed to reality. Furthermore, the system can provide sounds from any loudspeakers coupled with the system. For example, a camera of the system can be coupled with one or more speakers located within and outside of a zone within a field of view of the camera, as well coupled with the camera itself. This can contribute to the generation of an immersive soundscape.

In this manner, the system can provide for a response including an immersive soundscape to conform to a theme of the area upon a detection of the entity. The detection of the entity includes images, sensed measurements, or audio associated with the entity or the environment in which the entity is attempting to perpetrate the event. The system can determine a type of the entity from the detection and can determine an audio output to provide via one or more loudspeakers of the system. The audio output can be configured for the entity and updated based on a continuous monitoring of the entity's response to the audio output. The ability to generate a customized soundscape to deter an entity reduces the waste of computational resources by reducing false-positive alarms as well as by providing a targeted response most likely to deter the entity from perpetrating the response.

BRIEF DESCRIPTION OF THE DRAWINGS

The accompanying drawings constitute a part of this specification, illustrate an embodiment, and, together with the specification, explain the subject matter of the disclosure.

DETAILED DESCRIPTION

Figure 1:
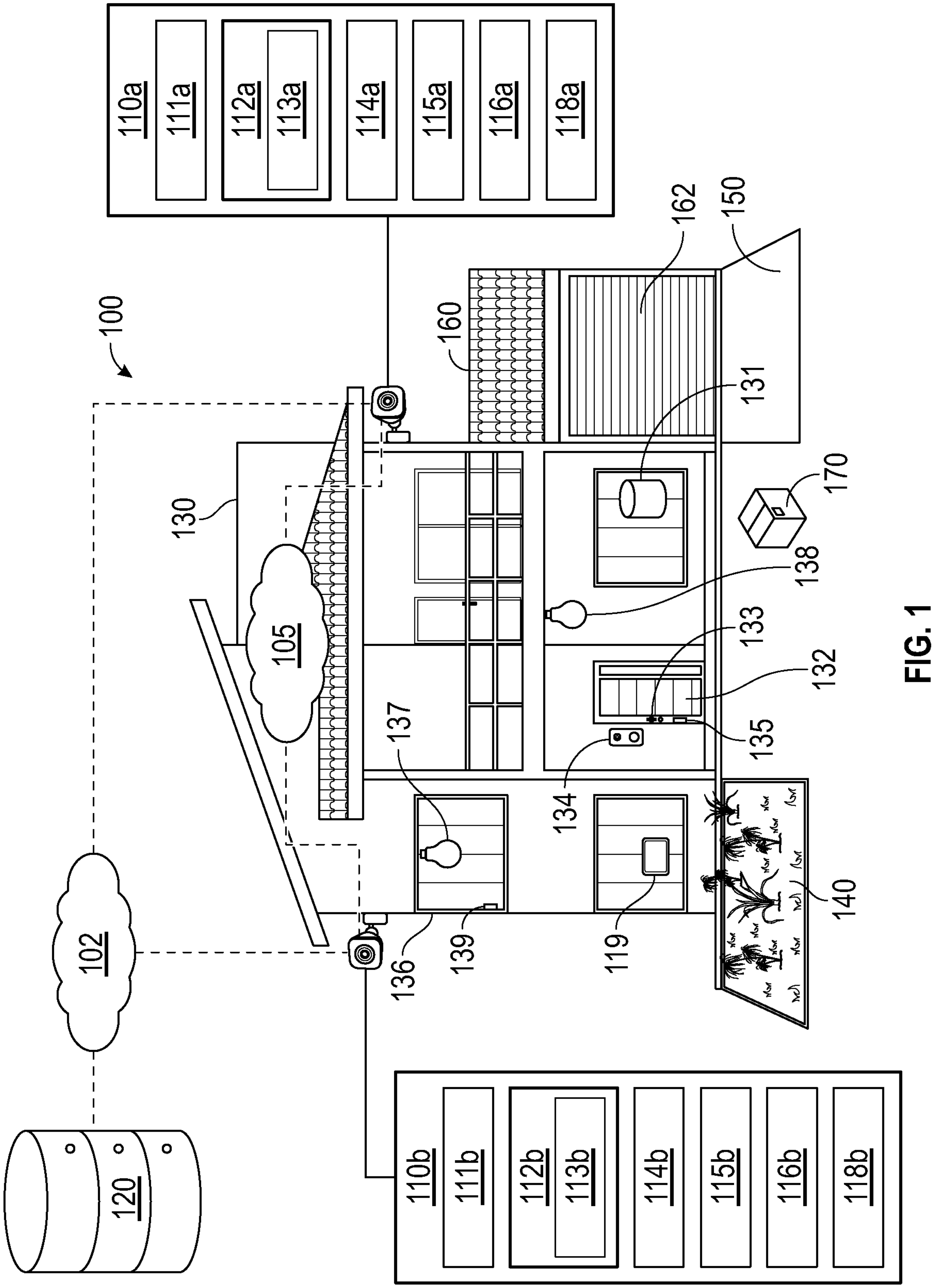
FIG. 1 illustrates a block diagram of an example system for generating novelty sounds based on a state of a building.

Reference will now be made to the embodiments illustrated in the drawings, and specific language will be used here to describe the same. It will nevertheless be understood that no limitation of the scope of the disclosure is thereby intended. Alterations and further modifications of the features illustrated here, and additional applications of the principles as illustrated here, which would occur to a person skilled in the relevant art and having possession of this disclosure, are to be considered within the scope of the disclosure.

Disclosed herein are systems and methods for generating novelty sounds based on a state of a building. A camera system can detect an entity, such as a person, within an area. The camera system can determine that the entity corresponds to one or more criteria. The camera system can identify a state of the area. Based on the one or more criteria or the state of the area, the camera system can identify a first sound to play to the entity. The camera system can identify a second sound based on the one or more criteria and play the second sound with the first sound.

FIG. 1 illustrates an example environment 100 in which the present systems and methods may be implemented. The environment 100 may include a site that can include one or more structures, any of which can be a building 130 such as a home, office, warehouse, garage, and/or the like. The building 130 may include various entryways, such as one or more doors 132, one or more windows 136, and/or a garage 160 having a garage door 162. The environment 100 may include multiple sites. In some implementations, the environment 100 includes multiple sites, each corresponding to a different property or building. In an example, the environment includes a cul-de-sac including multiple homes.

The environment 100 may include a first camera 110*a* and a second camera 110*b*, referred to herein collectively as cameras 110. The cameras 110 may be attached to the building 130. The cameras 110 may communicate with each other over a local network 105. The cameras 110 may communicate with a server 120 over a network 102. The local network 105 and/or the network 102, in some implementations, may each include a digital communication network that transmits digital communications. The local network 105 and/or the network 102 may each include a wireless network, such as a wireless cellular network, a local wireless network, such as a Wi-Fi network, a Bluetooth® network, a near-field communication ("NFC") network, an ad hoc network, and/or the like. The local network 105 and/or the network 102 may each include a wide area network ("WAN"), a storage area network ("SAN"), a local area network ("LAN") (e.g., a home network), an optical fiber network, the internet, or other digital communication network. The local network 105 and/or the network 102 may each include two or more networks. The network 102 may include one or more servers, routers, switches, and/or other networking equipment. The local network 105 and/or the network 102 may also include one or more computer readable storage media, such as a hard disk drive, an optical drive, non-volatile memory, RAM, or the like.

The local network 105 and/or the network 102 may be a mobile telephone network. The local network 105 and/or the network 102 may employ a Wi-Fi network based on any one of the Institute of Electrical and Electronics Engineers ("IEEE") 802.11 standards. The local network 105 and/or the network 102 may employ Bluetooth® connectivity and may include one or more Bluetooth connections. The local network 105 and/or the network 102 may employ Radio Frequency Identification ("RFID") communications, including RFID standards established by the International Organization for Standardization ("ISO"), the International Electrotechnical Commission ("IEC"), the American Society for Testing and Materials® (ASTM®), the DASH7™ Alliance, and/or EPCGlobal™.

In some implementations, the local network 105 and/or the network 102 may employ ZigBee® connectivity based on the IEEE 802 standard and may include one or more ZigBee connections. The local network 105 and/or the network 102 may include a ZigBee® bridge. In some implementations, the local network 105 and/or the network 102 employs Z-Wave® connectivity as designed by Sigma Designs® and may include one or more Z-Wave connections. The local network 105 and/or the network 102 may employ an ANT® and/or ANT+® connectivity as defined by Dynastream® Innovations Inc. of Cochrane, Canada and may include one or more ANT connections and/or ANT+ connections.

The first camera 110*a* may include an image sensor 115*a*, a processor 111*a*, a memory 112*a*, a radar sensor 114*a*, a speaker 116*a*, and a microphone 118*a*. The memory 112*a* may include computer-readable, non-transitory instructions which, when executed by the processor 111*a*, cause the processor 111*a* to perform methods and operations discussed herein. The processor 1/1*a* may include one or more processors. The second camera 110*b* may include an image sensor 115*b*, a processor 111*b*, a memory 112*b*, a radar sensor 114*b*, a speaker 116*b*, and a microphone 118*b*. The memory 112*b* may include computer-readable, non-transitory instructions which, when executed by the processor 111*b*, cause the processor to perform methods and operations discussed herein. The processor 111*a* may include one or more processors.

The memory 112*a* may include an AI model 113*a*. The AI model 113*a* may be applied to or otherwise process data from the camera 110*a*, the radar sensor 114*a*, and/or the microphone 118*a* to detect and/or identify one or more objects (e.g., people, animals, vehicles, shipping packages or other deliveries, or the like), one or more events (e.g., arrivals, departures, weather conditions, crimes, property damage, or the like), and/or other conditions. For example, the cameras 110 may determine a likelihood that an object 170, such as a package, vehicle, person, or animal, is within an area (e.g., a geographic area, a property, a room, a field of view of the first camera 110*a*, a field of view of the second camera 110*b*, a field of view of another sensor, or the like) based on data from the first camera 110*a*, the second camera 110*b*, and/or other sensors.

The memory 112*b* of the second camera 110*b* may include an AI model 113*b*. The AI model 113*b* may be similar to the AI model 113*a*. In some implementations, the AI model 113*a* and the AI model 113*b* have the same parameters. In some implementations, the AI model 113*a* and the AI model 113*b* are trained together using data from the cameras 110. In some implementations, the AI model 113*a* and the AI model 113*b* are initially the same, but are independently trained by the first camera 110*a* and the second camera 110*b*, respectively. For example, the first camera 110*a* may be focused on a porch and the second camera 110*b* may be focused on a driveway, causing data collected by the first camera 110*a* and the second camera 110*b* to be different, leading to different training inputs for the first AI model 113*a* and the second AI model 113*b*. In some implementations, the AI models 113 are trained using data from the server 120. In an example, the AI models 113 are trained using data collected from a plurality of cameras associated with a plurality of buildings. The cameras 110 may share data with the server 120 for training the AI models 113 and/or a plurality of other AI models. The AI models 113 may be trained using both data from the server 120 and data from their respective cameras.

The cameras 110, in some implementations, may determine a likelihood that the object 170 (e.g., a package) is within an area (e.g., a portion of a site or of the environment 100) based at least in part on audio data from microphones 118, using sound analytics and/or the AI models 113. In some implementations, the cameras 110 may determine a likelihood that the object 170 is within an area based at least in part on image data using image processing, image detection, and/or the AI models 113. The cameras 110 may determine a likelihood that an object is within an area based at least in part on depth data from the radar sensors 114, a direct or indirect time of flight sensor, an infrared sensor, a structured light sensor, or other sensor. For example, the cameras 110 may determine a location for an object, a speed of an object, a proximity of an object to another object and/or location, an interaction of an object (e.g., touching and/or approaching another object or location, touching a car/automobile or other vehicle, touching or opening a mailbox, leaving a package, leaving a car door open, leaving a car running, touching a package, picking up a package, or the like), and/or another determination based at least in part on depth data from the radar sensors 114.

The environment 100 may include a user interface 119. The user interface 119 may be part of a device, such as a mobile phone, a tablet, a laptop, wall panel, or other device. The user interface 119 may connect to the cameras 110 via the network 102 or the local network 105. The user interface 119 may allow a user to access sensor data of the cameras 110. In an example, the user interface 119 may allow the user to view a field of view of the image sensors 115 and hear audio data from the microphones 118. In an example, the user interface may allow the user to view a representation, such as a point cloud, of radar data from the radar sensors 114.

The user interface 119 may allow a user to provide input to the cameras 110. In an example, the user interface 119 may allow a user to speak or otherwise provide sounds using the speakers 116.

In some implementations, the cameras 110 may receive additional data from one or more additional sensors, such as a door sensor 135 of the door 132, an electronic lock 133 of the door 132, a doorbell camera 134, and/or a window sensor 139 of the window 136. The door sensor 135, the electronic lock 133, the doorbell camera 134 and/or the window sensor 139 may be connected to the local network 105 and/or the network 102. The cameras 110 may receive the additional data from the door sensor 135, the electronic lock 133, the doorbell camera 134 and/or the window sensor 139 from the server 120.

In some implementations, the cameras 110 may determine separate and/or independent likelihoods that an object is within an area based on data from different sensors (e.g., processing data separately, using separate machine learning and/or other artificial intelligence, using separate metrics, or the like). The cameras 110 may combine data, likelihoods, determinations, or the like from multiple sensors such as image sensors 115, the radar sensors 114, and/or the microphones 118 into a single determination of whether an object is within an area (e.g., in order to perform an action relative to the object 170 within the area. For example, the cameras 110 and/or each of the cameras 110 may use a voting algorithm and determine that the object 170 is present within an area in response to a majority of sensors of the cameras and/or of each of the cameras determining that the object 170 is present within the area. In some implementations, the cameras 110 may determine that the object 170 is present within an area in response to all sensors determining that the object 170 is present within the area (e.g., a more conservative and/or less aggressive determination than a voting algorithm). In some implementations, the cameras 110 may determine that the object 170 is present within an area in response to at least one sensor determining that the object 170 is present within the area (e.g., a less conservative and/or more aggressive determination than a voting algorithm).

The cameras 110, in some implementations, may combine confidence metrics indicating likelihoods that the object 170 is within an area from multiple sensors of the cameras 110 and/or additional sensors (e.g., averaging confidence metrics, selecting a median confidence metric, or the like) in order to determine whether the combination indicates a presence of the object 170 within the area. In some embodiments, the cameras 110 are configured to correlate and/or analyze data from multiple sensors together. For example, the cameras 110 may detect a person or other object in a specific area and/or field of view of the image sensors 115 and may confirm a presence of the person or other object using data from additional sensors of the cameras 110 such as the radar sensors 114 and/or the microphones 118, confirming a sound made by the person or other object, a distance and/or speed of the person or other object, or the like. The cameras 110, in some implementations, may detect the object 170 with one sensor and identify and/or confirm an identity of the object 170 using a different sensor. In an example, the cameras detect the object 170 using the image sensor 115*a* of the first camera 110*a* and verifies the object 170 using the radar sensor 114*b* of the second camera 110*b*. In this manner, in some implementations, the cameras 110 may detect and/or identify the object 170 more accurately using multiple sensors than may be possible using data from a single sensor.

The cameras 110, in some implementations, in response to determining that a combination of data and/or determinations from the multiple sensors indicates a presence of the object 170 within an area, may perform initiate, or otherwise coordinate one or more actions relative to the object 170 within the area. For example, the cameras 110 may perform an action including emitting one or more sounds from the speakers 116, turning on a light, turning off a light, directing a lighting element toward the object 170, opening or closing the garage door 162, turning a sprinkler on or off, turning a television or other smart device or appliance on or off, activating a smart vacuum cleaner, activating a smart lawnmower, and/or performing another action based on a detected object, based on a determined identity of a detected object, or the like. In an example, the cameras 110 may actuate an interior light 137 of the building 130 and/or an exterior light 138 of the building 130. The interior light 137 and/or the exterior light 138 may be connected to the local network 105 and/or the network 102.

In some embodiments, the cameras 110 may perform initiate, or otherwise coordinate an action selected to deter a detected person (e.g., to deter the person from the area and/or property, to deter the person from damaging property and/or committing a crime, or the like), to deter an animal, or the like. For example, based on a setting and/or mode of operation of the systems or methods of the present disclosure may deter by projecting a deterrence sound, such as a voice, siren, or other noise to deter unwanted conduct or activity. The deterrence sound may be one sound or a combination of sounds, such as a voice (first sound), for example, with an overlayed background sound (second sound) that makes the deterrence sound appear more realistic. The deterrence sound may be selected according to a mode of the system, wherein the mode may be determined by the threat level of the person, animal, etc. being deterred. For example, if the person to be deterred is determined by the system to be approaching or looking into the window of a car parked in the camera's view, thus potentially preparing to break into the parked car, then the deterrence sound may be selected from a library of sounds to be an aggressive sound, such as a deep mans voice yelling. Similarly, if the threat level is determined by the system to be lower or minimal, then the deterrence sound may be selected by the system to be a softer or more kind deterrence sound, such as a woman's voice kindly requesting the person to go step away from the parked car. Deterrence sounds may be algorithmically mixed and matched by the system of the present disclosure based on the situation and deterrence level required. Mixed sounds will also make the system of the present disclosure unpredictable, and thus, more likely to deter unwanted activities.

Further, in response to failing to identify an identity of a person (e.g., an unknown person, an identity failing to match a profile of an occupant or known user in a library, based on facial recognition, based on bio-identification, or the like), and/or in response to determining a person is engaged in suspicious behavior and/or has performed a suspicious action, or the like, the cameras 110 may perform, initiate, or otherwise coordinate an action to deter the detected person. In some implementations, the cameras 110 may determine that a combination of data and/or determinations from multiple sensors indicates that the detected human is, has, intends to, and/or may otherwise perform one or more suspicious acts, from a set of predefined suspicious acts or the like, such as crawling on the ground, creeping, running away, picking up a package, touching an automobile and/or other vehicle, opening a door of an automobile and/or other vehicle, looking into a window of an automobile and/or other vehicle, opening a mailbox, opening a door, opening a window, throwing an object, or the like.

In some implementations, the cameras 110 may monitor one or more objects based on a combination of data and/or determinations from the multiple sensors. For example, in some embodiments, the cameras 110 may detect and/or determine that a detected human has picked up the object 170 (e.g., a package, a bicycle, a mobile phone or other electronic device, or the like) and is walking or otherwise moving away from the home or other building 101. In a further embodiment, the cameras 110 may monitor a vehicle, such as an automobile, a boat, a bicycle, a motorcycle, an offroad and/or utility vehicle, a recreational vehicle, or the like. The cameras 110, in various embodiments, may determine if a vehicle has been left running, if a door has been left open, when a vehicle arrives and/or leaves, or the like.

The environment 100 may include one or more regions of interest, which each may be a given area within the environment. A region of interest may include the entire environment 100, an entire site within the environment, or an area within the environment. A region of interest may be within a single site or multiple sites. A region of interest may be inside of another region of interest. In an example, a property-scale region of interest which encompasses an entire property within the environment 100 may include multiple additional regions of interest within the property.

The environment 100 may include a first region of interest 140 and/or a second region of interest 150. The first region of interest 140 and the second region of interest 150 may be determined by the AI models 113, fields of view of the image sensors 115 of the cameras 110, fields of view of the radar sensors 114, and/or user input received via the user interface 119. In an example, the first region of interest 140 includes a garden or other landscaping of the building 130 and the second region of interest 150 includes a driveway of the building 130. In some implementations, the first region of interest 140 may be determined by user input received via the user interface 119 indicating that the garden should be a region of interest and the AI models 113 determining where in the fields of view of the sensors of the cameras 110 the garden is located. In some implementations, the first region of interest 140 may be determined by user input selecting, within the fields of view of the sensors of the cameras 110 on the user interface 119, where the garden is located. Similarly, the second region of interest 150 may be determined by user input indicating, on the user interface 119, that the driveway should be a region of interest and the AI models 113 determining where in the fields of view of the sensors of the cameras 110 the driveway is located. In some implementations, the second region of interest 150 may be determined by user input selecting, on the user interface 119, within the fields of view of the sensors of the cameras 110, where the driveway is located.

In response to determining that a combination of data and/or determinations from the multiple sensors indicates that a detected human (e.g., an entity) is, has, intends to, and/or may otherwise perform one or more suspicious acts, is unknown/unrecognized, has entered a restricted area/zone such as the first region of interest 140 or the second region of interest 150, the cameras 110 may expedite a deter action, reduce a waiting/monitoring period after detecting the human and before performing a deter action, or the like. In response to determining that a combination of data and/or determinations from the multiple sensors indicates that a detected human is continuing and/or persisting performance of one or more suspicious acts, the cameras 110 may escalate one or more deter actions, perform one or more additional deter actions (e.g., a more serious deter action), or the like. For example, the cameras 110 may play an escalated and/or more serious sound such as a siren, yelling, or the like; may turn on a spotlight, strobe light, or the like; and/or may perform, initiate, or otherwise coordinate another escalated and/or more serious action. In some embodiments, the cameras 110 may enter a different state (e.g., an armed mode, a security mode, an away mode, or the like) in response to detecting a human in a predefined restricted area/zone or other region of interest, or the like (e.g., passing through a gate and/or door, entering an area/zone previously identified by an authorized user as restricted, entering an area/zone not frequently entered such as a flowerbed, shed or other storage area, or the like).

In a further embodiment, the cameras 110 may perform, initiate, or otherwise coordinate, a welcoming action and/or another predefined action in response to recognizing a known human (e.g., an identity matching a profile of an occupant or known user in a library, based on facial recognition, based on bio-identification, or the like) such as executing a configurable scene for a user, activating lighting, playing music, opening or closing a window covering, turning a fan on or off, locking or unlocking a door 102, lighting a fireplace, powering an electrical outlet, turning on or play a predefined channel or video or music on a television or other device, starting or stopping a kitchen appliance, starting or stopping a sprinkler system, opening or closing a garage door 103, adjusting a temperature or other function of a thermostat or furnace or air conditioning unit, or the like. In response to detecting a presence of a known human, one or more safe behaviors and/or conditions, or the like, in some embodiments, the cameras 110 may extend, increase, pause, toll, and/or otherwise adjust a waiting/monitoring period after detecting a human, before performing a deter action, or the like.

In some implementations, the cameras 110 may receive a notification from a user's smart phone that the user is within a predefined proximity or distance from the home, e.g., on their way home from work. Accordingly, the cameras 110 may activate a predefined or learned comfort setting for the home, including setting a thermostat at a certain temperature, turning on certain lights inside the home, turning on certain lights on the exterior of the home, turning on the television, turning a water heater on, and/or the like.

The cameras 110, in some implementations, may be configured to detect one or more health events based on data from one or more sensors. For example, the cameras 110 may use data from the radar sensors 114 to determine a heartrate, a breathing pattern, or the like and/or to detect a sudden loss of a heartbeat, breathing, or other change in a life sign. The cameras 110 may detect that a human has fallen and/or that another accident has occurred.

In some embodiments, the cameras 110 are configured to play and/or otherwise emit one or more sounds in response to detecting the presence of a human within an area. For example, the cameras 110 may play one or more sounds selected to deter a detected person from an area around a building 101, property 101, and/or object. The cameras 110, in some implementations, may vary sounds over time, dynamically layer and/or overlap sounds, and/or generate unique sounds, to preserve a deterrent effect of the sounds over time and/or to avoid, limit, or even prevent those being deterred from becoming accustomed to the same sounds used over and over.

The camera 110, in some implementations, stores and/or has access to a library comprising a plurality of different sounds and/or a set of dynamically generated sounds so that the controller 106 may vary the different sounds over time, not using the same sound often. In some embodiments, varying and/or layering sounds allows a deter sound to be more realistic and/or less predictable. Specifically, the system of the present disclosure may access a library of sounds and combine one or more sounds to create a layered sound. The library of sounds may include levels of sounds, meaning sounds with different severities, tones, or other variations. The layers of sounds may correspond with modes or levels of deterrence, with stronger deterrence corresponding to stronger sounds. Similarly, background sounds to be layered with deterrence sounds may also be categorized so that the sounds fit or match with the deterrence sounds. The system of the present disclosure may be configured to dynamically select multiple sounds corresponding to deterrence levels, whereby the sounds selected are appropriate for the desired deterrence level, as set or determined by the user. Similarly, the system of the present disclosure may select these sounds in a manner that makes the sounds appear to be real/random to the person being deterred.

One or more of the sounds may be selected to give a perception of human presence in the building 101, a perception of a human talking over an electronic speaker device, or the like which may be effective at preventing crime and/or property damage. For example, a library and/or other set of sounds may include audio recordings and/or dynamically generated sounds of one or more, male and/or female voices saying different phrases, such as for example, a female saying "hello?", a female and male together saying "can we help you?", a male with a gruff voice saying, "get off my property" and then a female saying "what's going on?", a female with a country accent saying "hello there", a dog barking, a teenager saying "don't you know you're on camera?", and/or a man shouting "hey!" or "hey you!", or the like.

In some implementations, the cameras 110 may dynamically generate one or more sounds (e.g., using machine learning and/or other artificial intelligence, or the like) with one or more attributes that vary from a previously played sound. For example, the cameras 110 may generate sounds with different verbal tones, verbal emotions, verbal emphases, verbal pitches, verbal cadences, verbal accents, or the like so that the sounds are said in different ways, even if they include some or all of the same words. In some embodiments, the cameras 110 and/or a remote computer 125 may train machine learning on reactions of previously detected humans in other areas to different sounds and/or sound combinations (e.g., improving sound selection and/or generation over time).

The cameras 110 may combine and/or layer these sounds (e.g., primary sounds), with one or more secondary, tertiary, and/or other background sounds, which may comprise background noises selected to give an appearance that a primary sound is a person speaking in real time, or the like. For example, a secondary, tertiary, and/or other background sound may include sounds of a kitchen, of tools being used, of someone working in a garage, of children playing, of a television being on, of music playing, of a dog barking, or the like. The cameras 110, in some embodiments, may be configured to combine and/or layer one or more tertiary sounds with primary and/or secondary sounds for more variety, or the like. For example, a first sound (e.g., a primary sound) may comprise a verbal language message and a second sound (e.g., a secondary and/or tertiary sound) may comprise a background noise for the verbal language message (e.g., selected to provide a real-time temporal impression for the verbal language message of the first sound, or the like).

In this manner, in various embodiments, the cameras 110 may intelligently track which sounds and/or combinations of sounds have been played, and in response to detecting the presence of a human, may select a first sound to play that is different than a previously played sound, may select a second sound to play that is different than the first sound, and may play the first and second sounds at least partially simultaneously and/or overlapping. For example, the cameras 110 may play a primary sound layered and/or overlapping with one or more secondary, tertiary, and/or background sounds, varying the sounds and/or the combination from one or more previously played sounds and/or combinations, or the like.

The cameras 110, in some embodiments, may select and/or customize an action based at least partially on one or more characteristics of a detected object. For example, the cameras 110 may determine one or more characteristics of the object 170 based on audio data, image data, depth data, and/or other data from a sensor. For example, the cameras 110 may determine a characteristic such as a type or color of an article of clothing being worn by a person, a physical characteristic of a person, an item being held by a person, or the like. The cameras 110 may customize an action based on a determined characteristic, such as by including a description of the characteristic in an emitted sound (e.g., "hey you in the blue coat!", "you with the umbrella!", or another description), or the like.

The cameras 110, in some implementations, may escalate and/or otherwise adjust an action over time and/or may perform a subsequent action in response to determining (e.g., based on data and/or determinations from one or more sensors, from the multiple sensors, or the like) that the object 170 (e.g., a human, an animal, vehicle, drone, etc.) remains in an area after performing a first action (e.g., after expiration of a timer, or the like). For example, the cameras 110 may increase a volume of a sound, emit a louder and/or more aggressive sound (e.g., a siren, a warning message, an angry or yelling voice, or the like), increase a brightness of a light, introduce a strobe pattern to a light, and/or otherwise escalate an action and/or subsequent action. In some implementations, the cameras 110 may perform a subsequent action (e.g., an escalated and/or adjusted action) relative to the object 170 in response to determining that movement of the object 170 satisfies a movement threshold based on subsequent depth data from the radar sensors 114 (e.g., subsequent depth data indicating the object 170 is moving and/or has moved at least a movement threshold amount closer to the radar sensors 114, closer to the building 130, closer to another identified and/or predefined object, or the like).

In some implementations, the cameras 110 and/or the server 120, may include image processing capabilities and/or radar data processing capabilities for analyzing images, videos, and/or radar data that are captured with the cameras 110. The image/radar processing capabilities may include object detection, facial recognition, gait detection, and/or the like. For example, the controller 106 may analyze or process images and/or radar data to determine that a package is being delivered at the front door/porch. In other examples, the cameras 110 may analyze or process images and/or radar data to detect a child walking within a proximity of a pool, to detect a person within a proximity of a vehicle, to detect a mail delivery person, to detect animals, and/or the like. In some implementations, the cameras 110 may utilize the AI models 113 for processing and analyzing image and/or radar data.

In some implementations, the cameras 110 are connected to various IoT devices. As used herein, an IoT device may be a device that includes computing hardware to connect to a data network and to communicate with other devices to exchange information. In such an embodiment, the cameras 110 may be configured to connect to, control (e.g., send instructions or commands), and/or share information with different IoT devices. Examples of IoT devices may include home appliances (e.g. stoves, dishwashers, washing machines, dryers, refrigerators, microwaves, ovens, coffee makers), vacuums, garage door openers, thermostats, HVAC systems, irrigation/sprinkler controller, television, set-top boxes, grills/barbeques, humidifiers, air purifiers, sound systems, phone systems, smart cars, cameras, projectors, and/or the like. In some implementations, the cameras 110 may poll, request, receive, or the like information from the IoT devices (e.g., status information, health information, power information, and/or the like) and present the information on a display and/or via a mobile application.

The IoT devices may include a smart home device 131. The smart home device 131 may be connected to the IoT devices. The smart home device 131 may receive information from the IoT devices, configure the IoT devices, and/or control the IoT devices. In some implementations, the smart home device 131 provides the cameras 110 with a connection to the IoT devices. In some implementations, the cameras 110 provide the smart home device 131 with a connection to the IoT devices. The smart home device 131 may be an AMAZON ALEXA device, an AMAZON ECHO, A GOOGLE NEST device, a GOOGLE HOME device, or other smart home hub or device. In some implementations, the smart home device 131 may receive commands, such as voice commands, and relay the commands to the cameras 110. In some implementations, the cameras 110 may cause the smart home device 131 to emit sound and/or light, speak words, or otherwise notify a user of one or more conditions via the user interface 119.

In some implementations, the IoT devices include various lighting components including the interior light 137, the exterior light 138, the smart home device 131, other smart light fixtures or bulbs, smart switches, and/or smart outlets. For example, the cameras 110 may be communicatively connected to the interior light 137 and/or the exterior light 138 to turn them on/off, change their settings (e.g., set timers, adjust brightness/dimmer settings, and/or adjust color settings).

In some implementations, the IoT devices include one or more speakers within the building. The speakers may be stand-alone devices such as speakers that are part of a sound system, e.g., a home theatre system, a doorbell chime, a Bluetooth speaker, and/or the like. In some implementations, the one or more speakers may be integrated with other devices such as televisions, lighting components, camera devices (e.g., security cameras that are configured to generate an audible noise or alert), and/or the like. In some implementations, the speakers may be integrated in the smart home device 131.

Figure 2:
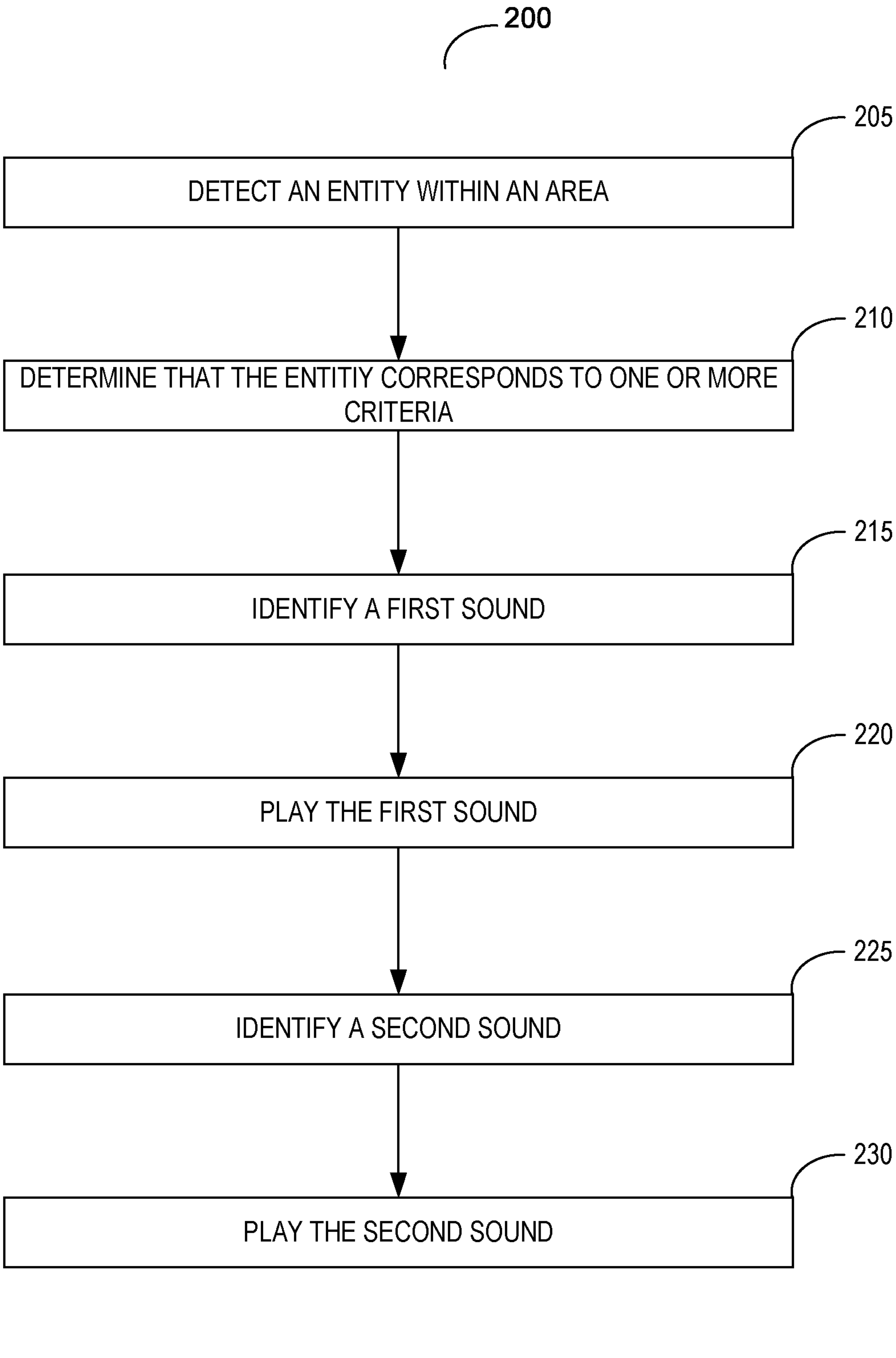
FIG. 2 illustrates a flow diagram of an example system for generating novelty sounds based on a state of a building.

FIG. 2 depicts a flow diagram of a method 200 for generating novelty sounds based on a state of an area. The method 200 may be implemented or performed using any of the components detailed herein. Embodiments may include additional, fewer, or different operations from those described in the method 200. The operations may be performed in the order shown, concurrently, or in a different order. The method 200 may be performed by one or more components of the system 100. For example, the method 200 may be performed by the first camera 110*a*, the second camera 110*b*, or the cameras 110.

The system can detect an entity within an area (205). The system can include an image capture device, such as the cameras 110, or an image sensor, such as one of the sensors of the environment 100 (e.g., the window sensor 139, the door sensor 135, among others). Through the methods described herein with reference to FIG. 1, the system can detect an entity using at least one of the cameras 110 or the various sensors. In some cases, the system can capture images of the entity using one or more of the cameras 110, the doorbell camera 134, or another camera of the system. The images can be any form of image, such as a video, still image, single or multiple frames of images, among others. In some cases, the images can include images in the visible light spectrum such as color or black and white images. In some cases, the images can include images in the invisible light spectrum, such as infrared or ultraviolet images.

The entity can be a person within the environment 100. In some cases, the entity can include multiple persons within the environment 100. The entity can be known or unknown to a homeowner, resident, or neighbor of the building 130. For example, the entity can include the mailman, a stranger, a child, a friend, a gardener, or a group of these people or other people. The system can detect the entity within an area of the environment, such as in the first region of interest 140 or the second region of interest 150, among others. The system can detect the entity near the door 132, such as detecting the entity within a threshold distance of the door 132.

The system can detect the entity within the area by detecting at least one of physical characteristics of the entity or behavioral characteristics of the entity. In some cases, the system can determine from the images, or other measurements from the sensors of the environment 100, characteristics of the entity which correspond to a person. The physical or behavioral characteristics can include the person carrying an object, such as a knife, bat, crowbar, or other such implement. The characteristics may include the detected person making noises related to an event, such as shouting, whispering, stomping, or speech indicating the event. The criteria may include the detected person engaging with a part of the building 130, such as the door 132, the e-lock 133, or the exterior light 138, among others. Physical characteristics which may correspond to an entity include a temperature of a region within the area, a shape of the entity, a size of the entity, a sound of the entity (e.g., a vocal pitch or tone), among others. Behavioral characteristics of the entity can include movements of the entity, a sound of the entity (e.g., a cadence of speech or a selection of words spoken), or other such behavioral characteristics described herein.

The system can determine that the entity corresponds to one or more criteria (210). The system can process the measurements from the various sensors of the environment 100 including the images captured by the cameras 110 to determine one or more criteria of the entity. The criteria of the entity can include a type of the entity, an identity of the entity, a perceived intention of the entity, among others. For example, a type of the entity can include a profession, a social classification (e.g., neighbor, friend, mother, criminal), demographic information of the entity (e.g., a sex, gender, age, ethnicity, or race), among others. An identity of the entity can include a name, an identifier of a device associated with the entity (e.g., a MAC address of a phone of the entity, among others), a vehicle associated with the entity, among others. A perceived intention of the entity can include an event which the entity is determined likely to perpetrate, such as trimming a garden of the environment 100 or stealing an object from a region of interest of the environment 100.

The criteria can be determined from the one or more measurements. The one or more sensors of the environment 100 (e.g., the door sensor 135, the doorbell camera 134, the window sensor 139, the radar sensor 114, the image sensor 115, or the microphone 118) may detect measurements associated with the criteria. For example, a first measurement within a range of temperatures, a second measurement within a range of heights, and a third measurement within a range of cadence can correspond to a criteria. associated with a type of entity. For example, a detection by the sensors of a person moving below a threshold speed and speaking in whispers can indicate a criteria associated with a burglar.

In some embodiments, image processing may be utilized to detect or otherwise identify an entity within an area as corresponding to the criteria. In some embodiments, a machine-learning model may be trained and utilized to detect or otherwise identify the entity within the area as corresponding to the criteria, or the machine learning model may be trained and utilized to determine the criteria to which the entity within the area corresponds to. The machine-learning model may be trained by applying the machine-learning model on historical data including image data of various objects and entities. In an example, a burglar may be identified, using a machine-learning model executed on a camera, on a porch of a house. Determining the criteria may include tracking movement of the entity into the area. In an example, a burglar may be identified, using a machine-learning model executed on a camera, by tracking the movement of the burglar across a lawn of the house to a window of the house. The entity may be identified as an entity type, such as a burglar or mailman, based on the movement of the entity within the area. For example, an entity may be identified as a burglar based on movements performed by the entity which matches the criteria of a burglar, such as pacing in place, shaking a door, or checking over his shoulder. The entity may be identified as an unknown or unrecognized entity based on a comparison of a face, movements, voice, or other biometrics of the entity to a repository of known entities, such as performed by a machine-learning model executing facial or other recognition techniques. The cameras 110 may perform image recognition functions as described herein to identify the criteria corresponding to the entity. For example, the cameras 110 may analyze the captured images for a gait of the entity, a face of the entity (e.g., by facial recognition), objects the entity may be carrying, among others as described herein. In some cases, the cameras 110 can identify features of the entity from the images. Features of the images can include an object carried by the entity, a facial profile or structure of the entity, biometrics of the entity, clothing worn by the entity, among others.

The system may determine from at least one of the criteria determined based on the measurements and/or images by the machine-learning model, that the entity corresponds to a type of person, such as an unfriendly person, a burglar, a mailman, etc. In some cases, the system may determine, by providing images to the machine learning model, that the entity corresponds to one or more types. In some cases, the system may determine that features of the entity determined from image recognition techniques performed by the cameras executing a machine-learning model meet a threshold for features of the one or more criteria. As an illustrative example, a criteria corresponding to a burglar may be associated with features related to a gait of an entity being slow, crouched, or crawling, features related to clothing of an entity being black and fully covering, a face of an entity being obscured, among others. Continuing with the example, the system may determine, based on the machine learning model, that the features meet a threshold number of features to identify the entity as corresponding to a criteria.

A type and/or identity of the entity may be determined. In an example, a camera, using a machine-learning model, may identify an entity as a type as described herein based on one or more features of the entity matching a type criteria. In an example, the machine-learning model may classify the entity as a burglar. In an example, a camera, using a machine-learning model, may identify an identifier of an entity, such as a nametag or an identifier of a device associated with the entity, such as a MAC address of a cellphone. The camera may associate the identifier with an image of the entity and send a notification to a person associated with the area in which the entity is. In this way, the camera can monitor, and report to the person, an entity within the area who may be perpetrating an event such as a crime. In an example, the camera may generate a notification to the user that an unknown entity or an entity matching the criteria of a burglar or identified to correspond to the criteria of a burglar is in the area. The notification may identify the entity, such as by transmitting an image of the entity to the person via a device associated with the person.

In some embodiments, detecting the entity within the area (205) can include determining that the entity corresponds to the one or more criteria (210). Image processing may be utilized to detect or otherwise identify the entity within a field of view of a camera 110 or image data captured therefrom. In some embodiments, a machine-learning model may be trained and utilized to detect or otherwise identify the entity. The machine-learning model may be trained by applying the machine-learning model on historical data including image data of various persons in various clothing. In some implementations, identifying the entity may include detecting a presence of a person. Identifying the entity may include determining one or more characteristics of the entity, such as the behavioral or physical characteristics described herein. For example, determining the one or more characteristics of the entity may include determining clothing, height, girth, weight, hair color, gait, category, profession, identity, and/or other characteristics. In an example, a camera executing a machine-learning model may determine that an entity is wearing black pants and a black shirt. In an example, a camera executing a machine-learning model may determine that an entity is a mail carrier or a delivery driver. In an example, a camera executing a machine-learning model may determine that an entity is a male teenager. In an example, a camera executing a machine-learning model may determine an entity's identity using facial recognition and/or other characteristics. Determining the one or more characteristics of the entity may include determining one or more actions of the entity. In an example, a camera executing a machine-learning model may determine that an entity is attempting to hide from the camera. In an example, a camera executing a machine-learning model may determine that a entity has passed by a house multiple times. In an example, a camera executing a machine-learning model may determine that an entity is looking in the windows of a house.

In addition to capturing measurements and images to determine a corresponding criteria for the detected entity within the area, the system can process the measurements and/or the images to determine a state of an area. The system can process the measurements prior to the arrival of the detected person or upon the arrival of the detected person to determine the state of the area. The system may employ one or more machine-learning models to determine the state of the area. For example, the machine learning-model may be trained on historical states of the area during different time periods, different persons in or around the area, and with different noises corresponding to the state. The state of the area can refer to a time period of the area, a setting of the area (as input though the user interface 119), among others, that determines a set of actions available for selection by the camera 110.

In some implementations, the state can include an occurrence of a holiday. For example, at Halloween or Christmas, it may be commonplace for unknown individuals (e.g., trick-or-treaters or carolers) to approach the building 130, and thereby the camera 110 may select from a set of security actions based on the holiday occurring. In some implementations, the state can include a time of day, such as a time of day programmed or recognized by the cameras 110 as when the environment 100 is unoccupied (e.g., all residents are at work or school). In some implementations, the state can include a party occurring, such that one or more unknown vehicle or persons may be within the environment 100. In some implementations, the state can include a vacation, in which the residents are not within the environment for a longer period of time than during their typical schedules. In some implementations, the state can include a region of interest occupied, such as children playing in the lawn or a band practicing in the garage 160.

The system can determine the state of the area according to a schedule of states. The schedule of states can be a schedule denoting events, time periods, or dates by which to change a current state to the state indicated by the schedule of states. In some cases, the schedules of states may define periods of time (e.g., specific months or days) associated with a particular state. For example, the schedule of states may define the month of October as associated with a state corresponding to Halloween or may define a day of the year as associated with a state corresponding to a resident's birthday of the building 130. In this manner, the system can map states to periods of time according to a schedule.

The schedule of states may not assign a state for a period of time and instead defer to other methods of determining the state. For example, the schedule of states may determine periods of time as not corresponding to a particular state and may instead defer to the sensors of the system or the camera 110 to determine the state of the area, as described herein. In some implementations, a user may select the state of the area via the user interface 119. For example, the user may select a state corresponding to Halloween, Christmas, an unfriendly entity, or vacation, among others, by the user interface 119 presenting on a client device. The schedule of states may be user-provided. For example, a user may define a schedule mapping periods of time to states through the user interface 119. The schedule of states may be downloaded, such as from a remote server.

Upon determining the criteria corresponding to the entity, the system can generate a profile for the entity. The profile may identify the entity by the identification methods described herein. The profile can include the determined one or more criteria for the entity. For example, the profile can include images of the entity, a voice of the entity, a type of the entity, an identification of the entity, or other such information gathered about the entity from at least the cameras and/or the sensors.

In some implementations, the system can transmit information about the entity to a client device associated with the area. For example, the system can transmit the profile generated for the entity to a cellphone of an owner or resident of the building 130. The client device may transmit or upload information about the entity to the profile. For example, a user of the client device may input (via the user interface 119) a name of the entity into the profile based on an image of the entity transferred to the client device.

The system can identify a first sound (215). The system can identify a first sound corresponding to the one or more criteria or a state of the area. In some cases, the system can identify the sounds to provide via the one or more speakers 116. The system can identify the sounds from one or more sources. For example, the system can identify the first sound by selecting the first sound from a library of sounds (as described herein with reference to FIG. 1) based on a mapping between the one or more criteria, the state of the area, and the sounds within the library of sounds.

In some cases, identifying the first sound can include generating the first sound by providing the one or more criteria, the state of the area, or a combination thereof to a machine learning model trained to generate sounds for the environment 100. The machine learning model may generate one or more sounds based on the inputs. The one or more sounds can be like the sounds described herein, including human voices, sirens, animal noises, object noises, or any variety of noises. In some cases, the machine learning model may develop a sound based on a voice or sound provided by a person associated with the building 130. For example, an owner of the building 130 can provide his voice to the library of sounds, to the machine learning model, or to both. The machine learning model may generate additional speech, phrases, or text in a vocal pattern, pitch, or tone similar to the provided sounds by the person associated with the building 130.

One or more of the sounds may include noises which are repulsive to the human ear or which garner attention of passersby or occupants of the building 130. For example, the sounds can include a whistle in a frequency range, decibel level, or duration which shocks, scares, or otherwise dissuades the detected person. The sounds can include a siren, whistle, beep, ring, screech, horn, or other such sound to provide an alert to others or to deter the person from perpetrating the event.

One or more sounds may correspond to a theme associated with the state of the area. In some cases, the state of the area can correspond to a theme. The theme can define one or more novelty actions based on the state of the area. For a state of the area corresponding to Halloween, the theme can be spooky, scary, haunted, or eerie, among others. As another illustrative example, the state of the area can correspond to Christmas and the theme can include Santa's Workshop, or winter wonderland, among others. In some cases, the theme can define a novelty sound associated with the state. For example, for a theme of "haunted," the system may identify a sound including wailing, thunder-strikes, or cackling, among others. In some cases, upon a detection of an entity in proximity (e.g., within a threshold distance of) the door 132, the system may identify a sound based on a state including a theme.

Upon a detection of an entity within the threshold distance to the door 132, the system may determine that the state corresponds to a holiday or other state including a theme and may identify the first sound based on the theme. The themed sound can be presented upon the presence of the person in a particular area or may be further conditioned on the person ringing a doorbell, knocking on the door, or taking other action or gesture. As an illustrative example, the system may identify a child near the door 132 and may determine, based on a state corresponding to Halloween, a themed novelty sound, such as saying "Boo!" The system may present these themed sounds for entities that are unknown, e.g., where the system is not able or has not tried to recognize the identity of the entity. The system may also present the themed sound for a period of time (e.g., during a holiday) or as configured by a user (e.g., any time someone rings a doorbell during the day). The system may have one or more preconfigured sounds for a particular state, and the system may choose from multiple sounds to play.

In a particular state (e.g., on Halloween), the system may apply a time threshold to an entity that is detected in a zone (e.g., a person on a front porch of a house). If the time threshold exceeds a certain amount of time (e.g., 5 seconds, 10 seconds, 15 seconds, 30 seconds), the system will activate the sound for presentment to the entity. By applying the threshold, the system may avoid playing the sound for a delivery or a homeowner. After the time has elapsed, the system will play the sound associated with that state.

The cameras 110 may communicate with other cameras associated with other environments similar to the environment 100 to coordinate the frequency of one or more sounds. For example, the cameras may coordinate with other cameras in the neighborhood to prevent the frequency of a specific sound from occurring over a threshold frequency. In this manner, the deterrent effects of the sounds are preserved throughout neighborhoods in which a person may be attempting to perpetrate an event.

The system can play the first sound (220). The speakers 116 can play the first sound identified by the system based on the one or more criteria and/or the state of the area. The system can play the first sound or any sounds at any volume, tone, or pitch. The system can play the first sound for any duration. In some cases, the system can play the first sound for a predetermined period of time. In some cases, the system can play the first sound until detecting a stimulus, such as a change in a characteristic of the entity. For example, the system can play the first sound until detecting that the entity has left the environment 100. In some cases, the system can continue to play the first sound upon a determination that the entity has not left the area, or upon a determination that the entity is exhibiting one or more characteristics corresponding to the criteria. Playing the first sound can include the system playing, by a speaker device (e.g., the speaker 116), the first sound to deter the entity from perpetrating an event within the area.

The event can include one or more of a set of actions performed by the detected entity. In some implementations, the event is perpetrated or to-be perpetrated by an unfriendly person. Events perpetrated by an unfriendly person can include crimes or mischief such as package theft, burglary, breaking and entering, graffiti, stalking, among others. The system can determine one or more criteria of the person which may indicate that the person is unfriendly or likely to perpetrate an event. For example, the detected person may exhibit physical or behavioral criteria such as crawling, checking over his shoulder, kicking, or running, among others.

In some cases, responsive to playing the first sound, the system can determine one or more second criteria of the entity. The system may determine the one or more second criteria during playback of the first sound or after playback of the first sound. The system can determine the one or more second criteria in a similar or the same manner as determining the criteria. In some cases, the system can continuously monitor for a change in the characteristics of the entity or the criteria associated with the entity The system can identify a second sound (225). The system may identify a second sound corresponding to the one or more criteria, the state of the area, and the first sound. In some cases, the system can determine the second sound concurrently with determining the first sound. In some cases, the system can identify the second sound upon a detection in a change of the criteria of the entity of the characteristics of the entity. The system may identify the second sound corresponding to the second criteria. For example, the system may identify a second sound upon a determination that the entity is continuing to crawl, rattle the door 132, or perform another action associated with the event.

The system can play the second sound (230). The system can play the second sound on one or more speakers, such as the speakers 116. In some cases, the system can play the second sound to deter the entity from perpetrating the event. In some cases, the system can determine an order, duration, or overlapping of the first and second sounds. For example, the system can provide the first sound over a different speaker than the second sound, or the system can provide the sounds from the same speaker. The system can play the sounds in at least partial concurrence. For example, the system can play the second sound while simultaneously playing the first sound, for at least a period of time. In this manner, a more realistic soundscape can exist which may deter the entity from perpetrating the event, due to creating a perception of homeowners at home, a protective pet, an identification of the entity, among others.

In some cases, the system can identify a third sound corresponding to the one or more criteria, the state of the area, the first sound, and the second sound. In a similar manner as described, the system can identify and play a third sound. The third sound, and any other subsequent sounds, can be played in partial concurrence with prior sounds to deter the entity from perpetrating the event. In some cases, the system may play the third sound or any sound from separate speakers to better create a perception to deter the entity.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then" and "next," among others, are not intended to limit the order of the steps; these words are simply used to guide the reader through the description of the methods. Although process flow diagrams may describe the operations as a sequential process, many of the operations can be performed in parallel or concurrently. In addition, the order of the operations may be rearranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, among others, may be passed, forwarded, or transmitted via any suitable means including memory sharing, message passing, token passing, network transmission, etc.

The actual software code or specialized control hardware used to implement these systems and methods is not limiting. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. An apparatus comprising:

an image capture device; and one or more processors coupled with memory and configured to:

detect, using the image capture device, an entity within an area;

determine that the entity corresponds to one or more criteria;

identify a first sound corresponding to the one or more criteria and a state of the area;

play, by a speaker device, the first sound to deter the entity from perpetrating an event within the area;

identify a second sound corresponding to the one or more criteria, the state of the area, and the first sound; and play, by the speaker device, the second sound to deter the entity from perpetrating the event.

2. The apparatus of claim 1, wherein the one or more processors are configured to:

detect the entity within the area by detecting at least one of physical characteristics of the entity or behavioral characteristics of the entity.

3. The apparatus of claim 1, wherein the one or more processors are configured to:

detect the entity within the area based on images captured of the entity;

determine, using image recognition techniques, features of the entity from the images; and determine that the entity corresponds to the one or more criteria responsive to determining that the features of the entity meet a threshold for features of the one or more criteria.

4. The apparatus of claim 1, wherein the state comprises one or more of a time of day, a resident within the area, or a holiday.

5. The apparatus of claim 1, wherein identifying the first sound corresponding to the one or more criteria and a state of the area includes providing the state and the one or more criteria as inputs to a machine learning model to generate the first sound.

6. The apparatus of claim 1, wherein the one or more processors are configured to:

determine, responsive to playing the first sound, one or more second criteria of the entity; and identify the second sound corresponding to the one or more criteria, the state of the area, and the one or more second criteria.

7. The apparatus of claim 1, wherein the one or more processors are configured to:

identify a third sound corresponding to the one or more criteria, the state of the area, the first sound, and the second sound; and play, by a second speaker device located separately from the speaker device, the third sound to deter the entity from perpetrating the event.

8. The apparatus of claim 1, wherein the first sound and the second sound are played in at least partial concurrence.

9. An apparatus comprising:

an image capture device; and one or more processors coupled with memory and configured to:

determine, based on a schedule of states, a state of an area;

detect, using the image capture device, an entity within the area;

identify a sound corresponding to the state of the area; and play, by a speaker device, the sound to present a theme associated with the state of the area.

10. The apparatus of claim 9, wherein the schedule of states includes holidays.

11. A method, comprising:

detecting, by one or more processors coupled with memory and an image capture device, an entity within an area;

determining, by the one or more processors, that the entity corresponds to one or more criteria;

identifying, by the one or more processors, a first sound corresponding to the one or more criteria and a state of the area;

playing, by the one or more processors via a speaker device, the first sound to deter the entity from perpetrating an event within the area;

identifying, by the one or more processors, a second sound corresponding to the one or more criteria, the state of the area, and the first sound; and playing, by the one or more processors via the speaker device, the second sound to deter the entity from perpetrating the event.

12. The method of claim 11, comprising:

detecting, by the one or more processors, the entity within the area by detecting at least one of physical characteristics of the entity or behavioral characteristics of the entity.

13. The method of claim 11, comprising:

detecting, by the image capture device, the entity within the area based on images captured of the entity;

determining, by the one or more processors using image recognition techniques, features of the entity from the images; and determining, by the one or more processors, that the entity corresponds to the one or more criteria responsive to determining that features of the entity meet a threshold for features of the one or more criteria.

14. The method of claim 11, comprising:

detecting, by the image capture device, the one or more criteria of the entity; and generating, by the one or more processors, a profile corresponding to the one or more criteria of the entity.

15. The method of claim 11, wherein the state comprises one or more of a time of day, a resident within the area, or a holiday.

16. The method of claim 11, comprising: wherein identifying the first sound corresponding to the one or more criteria and a state of the area includes providing the state and the one or more criteria as inputs to a machine learning model to generate the first sound.

17. The method of claim 11, comprising:

determining, by the one or more processors, responsive to playing the first sound, one or more second criteria of the entity; and identifying, by the one or more processors, the second sound corresponding to the one or more criteria, the state of the area, and the one or more second criteria.

18. The method of claim 11, comprising:

identifying, by the one or more processors, a third sound corresponding to the one or more criteria, the state of the area, the first sound, and the second sound; and playing, by the one or more processors via a second speaker device located separately from the speaker device, the third sound to deter the entity from perpetrating the event.

19. The method of claim 11, comprising:

capturing, by the image capture device, images of the entity in the area; and transmitting, by the one or more processors, the images of the entity to a client device associated with the area.

20. The method of claim 11, wherein the first sound and the second sound are played in at least partial concurrence.

* * * * *